US009195415B2

(12) United States Patent
Asai

(10) Patent No.: US 9,195,415 B2
(45) Date of Patent: Nov. 24, 2015

(54) PRINT CONTROLLER, COMPUTER READABLE MEDIUM HAVING COMPUTER PROGRAM PRODUCT FOR GENERATING PRINT DATA BASED ON PRINT SETTING INFORMATION STORED THEREON, AND METHOD OF GENERATING PRINT SETTING INFORMATION

(75) Inventor: Daisuke Asai, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 151 days.

(21) Appl. No.: 13/048,155

(22) Filed: Mar. 15, 2011

(65) Prior Publication Data

US 2011/0242591 A1    Oct. 6, 2011

(30) Foreign Application Priority Data

Mar. 31, 2010    (JP) ................. 2010-081624

(51) Int. Cl.
G06F 3/12    (2006.01)
(52) U.S. Cl.
CPC ............ G06F 3/1205 (2013.01); G06F 3/1253 (2013.01); *G06F 3/1208* (2013.01); *G06F 3/1254* (2013.01)
(58) Field of Classification Search
CPC .................................... G06F 3/1205
USPC ....................................... 358/1.15
See application file for complete search history.

(56) References Cited

U.S. PATENT DOCUMENTS 5,228,118 A * 7/1993 Sasaki ........................ 358/1.13
5,467,434 A * 11/1995 Hower et al. ............... 358/1.15
2003/0056176 A1 * 3/2003 Tanaka et al. ................ 715/522
2004/0125395 A1    7/2004 Onishi
2006/0221358 A1 * 10/2006 Takahashi ..................... 358/1.1

(Continued)

FOREIGN PATENT DOCUMENTS

JP    2004-199292 A    7/2004
JP    2005-196653 A    7/2005
JP    2009-116544 A    5/2009

(Continued)

OTHER PUBLICATIONS

JP Reasons for Refusal dated Dec. 13, 2011, JP Application No. 2010-081624; English Translation.

*Primary Examiner* — Peter K Huntsinger
*Assistant Examiner* — Bharatkumar Shah
(74) *Attorney, Agent, or Firm* — Banner & Witcoff, Ltd.

(57) ABSTRACT

An apparatus includes a processing unit and memory. The memory stores executable instructions that, when executed by the processing unit, cause the apparatus to provide an application tool and a generation section. The application tool is configured to edit a print condition based on print functional information relating to print functions provided with a printer. The generation section is configured to generate print setting information including a first print condition and a second print condition. The generating section generates the first print condition in a form so as to be editable by the application tool and generates the second print condition including at least a part of the first print condition in a form so as not to be editable by the application tool. The print data producing section is configured to produce print data based on the print setting information including the first print condition that has been edited by the application tool and the second print condition.

23 Claims, 11 Drawing Sheets

(56) References Cited

U.S. PATENT DOCUMENTS

2009/0116063 A1   5/2009   Takashima
2009/0237724 A1   9/2009   Furuya

FOREIGN PATENT DOCUMENTS

JP   2009-163727 A   7/2009
JP   2009-223834 A   10/2009

* cited by examiner

FIG.2

```
<Feature name="PaperSize">              ‥General item: paper size
    <Option name="A4" />                ‥‥Setting value: A4
    <Option name="Letter" />            ‥‥Setting value: letter
    <Option name="Legal" />             ‥‥Setting value: legal
</Feature>
<Feature name="Duplex" >                ‥General item: one-sided printing / two-sided printing
    <Option name="Simplex" />           ‥‥Setting value: one-sided printing
    <Option name=ShortEdge>             ‥‥Setting value: two-sided printing and short edge bookbinding
        <Property name=DuplexMode>      ‥‥‥Detailed item: two-sided printing mode
            <Value>Automatic</Value>    ‥‥‥‥Setting value: automatic
        </Property>
    </Option>
    <Option name=ShortEdge>             ‥‥Setting value: two-sided printing and short edge bookbinding
        <Property name=DuplexMode>      ‥‥‥Detailed item: two-sided printing mode
            <Value>Manual</Value>       ‥‥‥‥Setting value: manual
        </Property>
    </Option>
    <Option name=LongEdge>              ‥‥Setting value: two-sided printing and long edge bookbinding
        <Property name=DuplexMode>      ‥‥‥Detailed item: two-sided printing mode
            <Value>Automatic</Value>    ‥‥‥‥Setting value: automatic
        </Property>
    </Option>
    <Option name=LongEdge>              ‥‥Setting value: two-sided printing and long edge bookbinding
        <Property name=DuplexMode>      ‥‥‥Detailed item: two-sided printing mode
            <Value>Manual</Value>       ‥‥‥‥Setting value: manual
        </Property>
    </Option>
</Feature>
```

FIG.10

| | |
|---|---|
| <Feature name="PaperSize" > | ·· General item: paper size |
|   <Option name="Letter" /> | ··· Setting value: letter |
| </Feature> | |
| <Feature name="Duplex" > | ·· General item: one-sided printing/two-sided printing |
|   <Option name=ShortEdge> | ··· Setting value: two-sided printing and short edge bookbinding |

```
    <Property name=DuplexMode>    ····  Detailed item: two-sided printing mode
        <Value>Automatic</Value>  ·····  Setting value: manual
    </Property>
```
101

</Option>

</Feature>

FIG.11

<Feature name="PaperSize" >   · · General item: paper size

<Option name="Letter" />   · · · Setting value: letter

</Feature>

<Feature name="Duplex" >   · · General item: one-sided/two-sided printing

<Option name=ShortEdge />   · · · Setting value: two-sided printing and short edge bookbinding </Feature>

PRINT CONTROLLER, COMPUTER READABLE MEDIUM HAVING COMPUTER PROGRAM PRODUCT FOR GENERATING PRINT DATA BASED ON PRINT SETTING INFORMATION STORED THEREON, AND METHOD OF GENERATING PRINT SETTING INFORMATION

CROSS REFERENCE TO RELATED APPLICATION

The present application claims priority from Japanese Patent Application No. 2010-081624 filed on Mar. 31, 2010. The entire content of this priority application is incorporated herein by reference.

TECHNICAL FIELD

The present disclosure relates to a print controller, a computer readable medium having computer program product for generating print data based on print setting information stored thereon and a method of generating print setting information

BACKGROUND

The Microsoft Windows (registered trademark) operating system provides a printing system in which print setting information (Print Ticket) is generated based on print functional information (Print Capabilities).

FIG. 10 is a diagram illustrating an example of a Print Ticket. The Print Capabilities describes a plurality of setting values each of which is selected for each print setting item. The printer driver (print program) generates a Print Ticket based on the setting values (print condition) that are selected by a user out of the option setting values described in the Print Capabilities.

Since the Print Ticket uses XML text data, the application program itself generates a Print Ticket or edits the Print Ticket generated by the printer driver. In such a case, the application program acquires Print Capabilities from the printer driver and, generates and edits a Print Ticket based on the setting values (print condition) that are selected by a user out of the setting values described in the Print Capabilities.

There are some application programs that do not set appropriate print conditions when editing the Print Ticket that is generated by the printer driver. For example, some application programs set only general print conditions among those in the Print Capabilities and do not set detailed print conditions (for example, the print condition that is surrounded by dotted lines 101 in FIG. 10).

FIG. 11 illustrates an example of a Print Ticket that is edited by the application program that does not set detailed print conditions. In the example in FIG. 11, the setting value of the print setting item "Duplex" (that determines whether a print pattern is two-sided printing or one-sided printing) is set to "Duplex and Short Edge" (two-sided printing and short edge bookbinding). However, the setting value of the print setting item "Duplex Mode" is not set. The print setting item "Duplex Mode" is set to determine whether the "Duplex and Short Edge" is executed automatically or manually ("Automatic" or "Manual").

Thus, if appropriate print conditions are not set in the Print Ticket, the printer driver is not able to generate print data according to appropriate conditions.

SUMMARY

According to an aspect of the present invention, an apparatus includes a processing unit and memory. The memory stores executable instructions that, when executed by the processing unit, cause the apparatus to provide an application tool and a generation section. The application tool is configured to edit a print condition based on print functional information relating to print functions provided with a printer. The generation section is configured to generate print setting information including a first print condition and a second print condition. The generating section generates the first print condition in a form so as to be editable by the application tool and generates the second print condition including at least a part of the first print condition in a form so as not to be editable by the application tool. The print data producing section is configured to produce print data based on the print setting information including the first print condition that has been edited by the application tool and the second print condition.

BRIEF DESCRIPTION OF THE DRAWINGS

Illustrative aspects in accordance with the present invention will be described in detail with reference to the following drawings wherein:

FIG. 2 is a diagram illustrating an example of Print Capabilities;

FIG. 10 is a diagram illustrating a conventional example of the Print Ticket before editing; and FIG. 11 is a diagram illustrating a conventional example of the Print Ticket after editing.

DETAILED DESCRIPTION

<Illustrative Aspect>

An illustrative aspect of the present invention will be hereinafter explained with reference to FIGS. 1 to 8.

(1) Electrical Configuration of Print Controller

Figure 1:
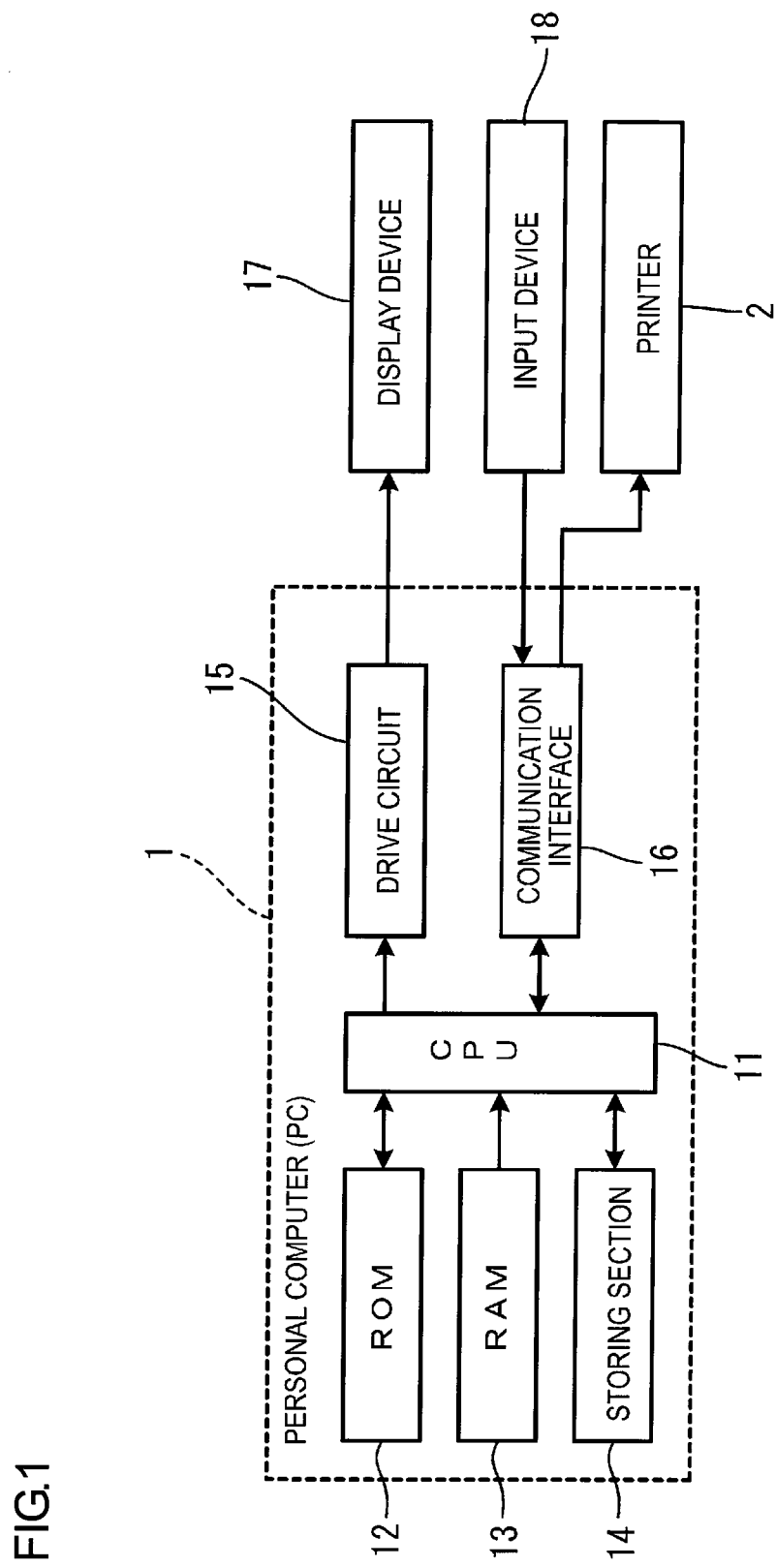
FIG. 1 is a block diagram illustrating a print controller according to an illustrative aspect of the present invention.

An electrical configuration of a personal computer 1 (an example of a computer and a print controller and hereinafter referred to as a PC) according to the illustrative aspect of the present invention will be explained with reference to FIG. 1. The PC 1 includes a CPU 11, a ROM 12, a RAM 13, a storing section 14, a display drive circuit 15, and a communication interface (communication I/F) 16.

The CPU 11 (an example of an application tool, a generation section, a print data producing section and a determination section) executes various programs stored in the ROM 12 and the storing section 14 and controls each component in the PC 1. The ROM 12 stores various programs that are executed by the CPU 11 and data. The RAM 13 is a main memory that is used when the CPU 11 executes various processes.

The storing section 14 is an external memory for storing various programs and data using a non-volatile storing medium such as a hard disk or a flash memory. The storing section 14 stores an operating system (OS), application programs (hereinafter referred to as an application) that make the CPU 11 to function as an application tool, at least one printer driver including a printer driver for the printer 2 (an example of a print control program), and Print Capabilities of at least one printer including the printer 2. The storing section 14 also stores a Print Ticket (an example of print setting information) that will be described later.

The Microsoft Windows (registered trademark) operating system is used in the illustrative aspect. The operating system is not limited to a Windows (registered trademark) operating system but any operating system is used if it includes a printing system using a Print Ticket. Any application is used if it is able to generate and edit a Print Ticket based on the Print Capabilities.

The display drive circuit 15 is a circuit that drives a display device 17 (CRT, a liquid crystal display) and connected to the display device 17 via a cable.

The communication interface 16 is provided as a USB (Universal Serial Bus) host interface and connected to an input device 18 (a mouse or a keyboard) or the printer 2.

The printer 2 (an example of a print device) forms images on a recording medium such as a paper by an electrophotographic method or an ink jet method. The printer 2 may be connected to the PC 1 via the communication network such as LAN (Local Area Network).

(2) Print Process

Next, a print process using print functional information referred to as Print Capabilities and print setting information referred to as a Print Ticket will be explained.

(2-1) Print Capabilities

An example of Print Capabilities is illustrated in FIG. 2. The Print Capabilities is data that is produced for each model of printers and described by XML text data. The Print Capabilities describes print setting items in which a user sets a setting value when the printer corresponding to the Print Capabilities executes a printing operation, and setting values that are settable in the print setting items.

The print setting items include one including only a Feature item (general item) and another one including a Feature item and a Property item (detailed item). For example, the print setting item "Paper size" includes only a Feature item and the print setting item "Duplex" (that determines whether a print pattern is two-sided printing or one-sided printing) includes Feature items and Property items. Even if the print setting item includes a Feature item and a Property item, it may include only a Feature item according to the setting value. For example, if the setting value of the print setting item "Duplex" is "Simplex" (one-sided printing), no setting value is set in the Property item.

The Feature tag <Feature name="xxx"> represents a Feature name of the Feature item. The portion of "xxx" represents a Feature name of the Feature item. This is same as tags explained below. Setting values that are settable in the Feature item are described between the tag <Feature name="xxx"> and the tag </Feature> with using the tag <Option name="xxx">. In the example illustrated in FIG. 2, "A4", "Letter" and "Legal" are settable as a setting value of the print setting item "Paper size", and "one-sided printing", "two-sided printing and short edge bookbinding" and "two-sided printing and long edge bookbinding" are settable as a setting value of the print setting item "One-sided printing or two-sided printing". In the print setting item including a Feature item and a Property item, the setting value of the Feature item is repeatedly described for every setting value of the Property item.

If the print setting item includes a Feature item and a Property item, an item name of the Property item subject to the Feature item is described between the tag <Option name="xxx"> and the tag </Option> with using the tag <Property name=xxx>.

One of the setting values that are settable in the Property item represented by the item name is described between the tag <Property name=xxx> and the tag </Property> with using the tag <Value>xxx</Value>. In the example illustrated in FIG. 2, "Automatic" or "Manual" is settable as a setting value of the "Two-sided printing mode". "Automatic" represents that a recording medium is flipped over automatically by the printer in the two-sided printing operation, and "Manual" represents that a user flips a recording medium over manually in the two-sided printing operation.

The print setting items "Paper size" and "One-sided printing or two-sided printing" are explained as the examples. The print setting items are determined by the print functions provided with the printer, and therefore "Color printing/black-and-white printing", "Plural pages on one-side printing" (such as two pages on one side of a paper), "Image quality" (high resolution/low resolution), "Percentage of enlargement/reduction" and others may be described in the print setting item according to the type of printers.

(2-2) Print Ticket

Figure 3:
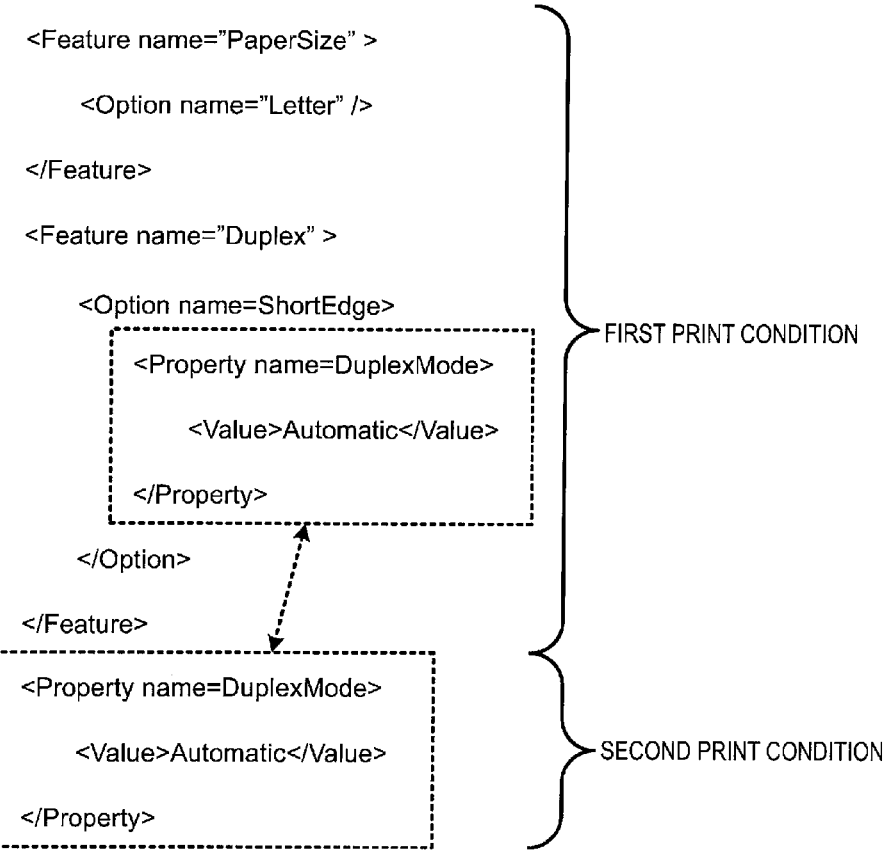
FIG. 3 is a diagram illustrating an example of a Print Ticket according to the illustrative aspect of the present invention.

An example of a Print Ticket according to the illustrative aspect is illustrated in FIG. 3. The print conditions selected by a user are described in the Print Ticket by XML text data. The print conditions are determined by combining setting values that are selected by a user out of the setting values described in the Print Capabilities.

The Print Ticket of the illustrative aspect includes a first print condition and a second print condition each of which represents the print condition selected by a user. The first print condition is described in a format (Tag structure) that can be edited by the application. A part of the second print condition is described in a format (Tag structure) that is different from the format of the first print condition (that cannot be edited by the application). The conventional Print Ticket includes only a first print condition. However, the Print Ticket of the illustrative aspect is different from the conventional Print Ticket in that it includes a second print condition.

The first print condition describes the print condition that is selected by a user in the format same as the Print Capabilities. However, the first print condition is different from the Print Capabilities in that only the setting value selected by a user is described between the tag <Feature name="xxx"> and the tag </Feature>. For example, if a user selects "Letter size" as the setting value of "Paper size", only the tag <Option name="Letter"> is described between the tag <Feature name="Paper size"> for setting a paper size and the tag </Feature> in the Print Ticket.

The second print condition describes only the setting values of a Property item among the setting values of the print setting items including a Feature item and a Property item. The format of the second print condition is different from the one of the Print Capabilities or the first print condition. The tag <Feature name="xxx"> is not used and the Property item from the tag <Property=xxx> to the tag </Property> is described in the Print Ticket as the second print condition. Thus, the Tag structure of the second print condition is different from that of Print Capabilities or the first print condition.

The application can generate and edit the first print condition. The application describes the setting value that is selected by a user out of the setting values described in the Print capabilities in the same format (same Tag structure) as the Print Capabilities in the Print Ticket. Accordingly, the application generates and edits the Print Ticket. Therefore, the application is able to edit the first print condition that is described in the same format as the Print Capabilities. Since the application generates and edits the Print Ticket based on the Print Capabilities, it is unable to describe the setting values in the Print Ticket in the format that is not described in the Print Capabilities. Since the second print condition is described in the Print Ticket in the format that is not described in the Print Capabilities, the application is unable to edit the second print condition.

The printer driver is able to generate and edit the first print condition based on the Print Capabilities. The printer driver is able to describe the setting values in the Print Ticket in a format (Tag structure) that is different from the Print Capabilities, and therefore the printer driver is able to generate and edit the second print condition.

(2-3) Flow of Print Process

Figure 4:
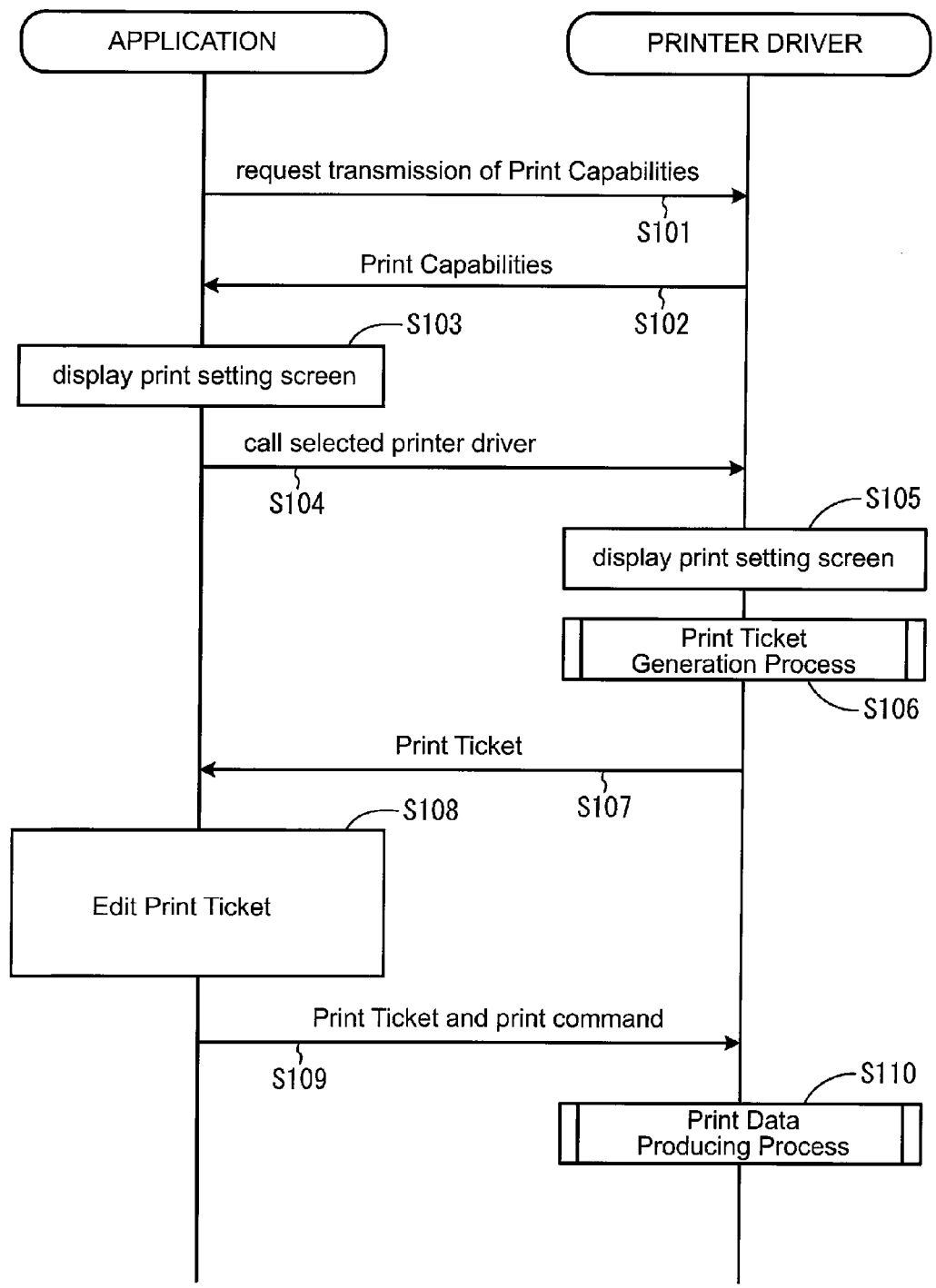
FIG. 4 is a sequence chart illustrating a flow of a printing process.

A print process using Print Capabilities and Print Ticket will be explained with reference to a sequence chart illustrated in FIG. 4. In the illustrative aspect, the application edits the Print Ticket that is generated by the printer driver. This process is started in response to the print instruction made by a user from a menu displayed by the application.

In the following, the CPU 11 that executes an application is simply referred to as the application and the CPU 11 that executes the printer driver is simply referred to as the printer driver.

At step 101, when the application receives a print instruction made by a user, it requests the printer driver of a printer that is selected as a normally-used one to transmit Print Capabilities. Here, the printer 2 is supposed to be the normally-used printer.

At step 102, the printer driver of the printer 2 transmits the Print Capabilities to the application.

At step 103, the application displays a print setting screen on the display device 17 based on the acquired Print Capabilities.

Figure 5:
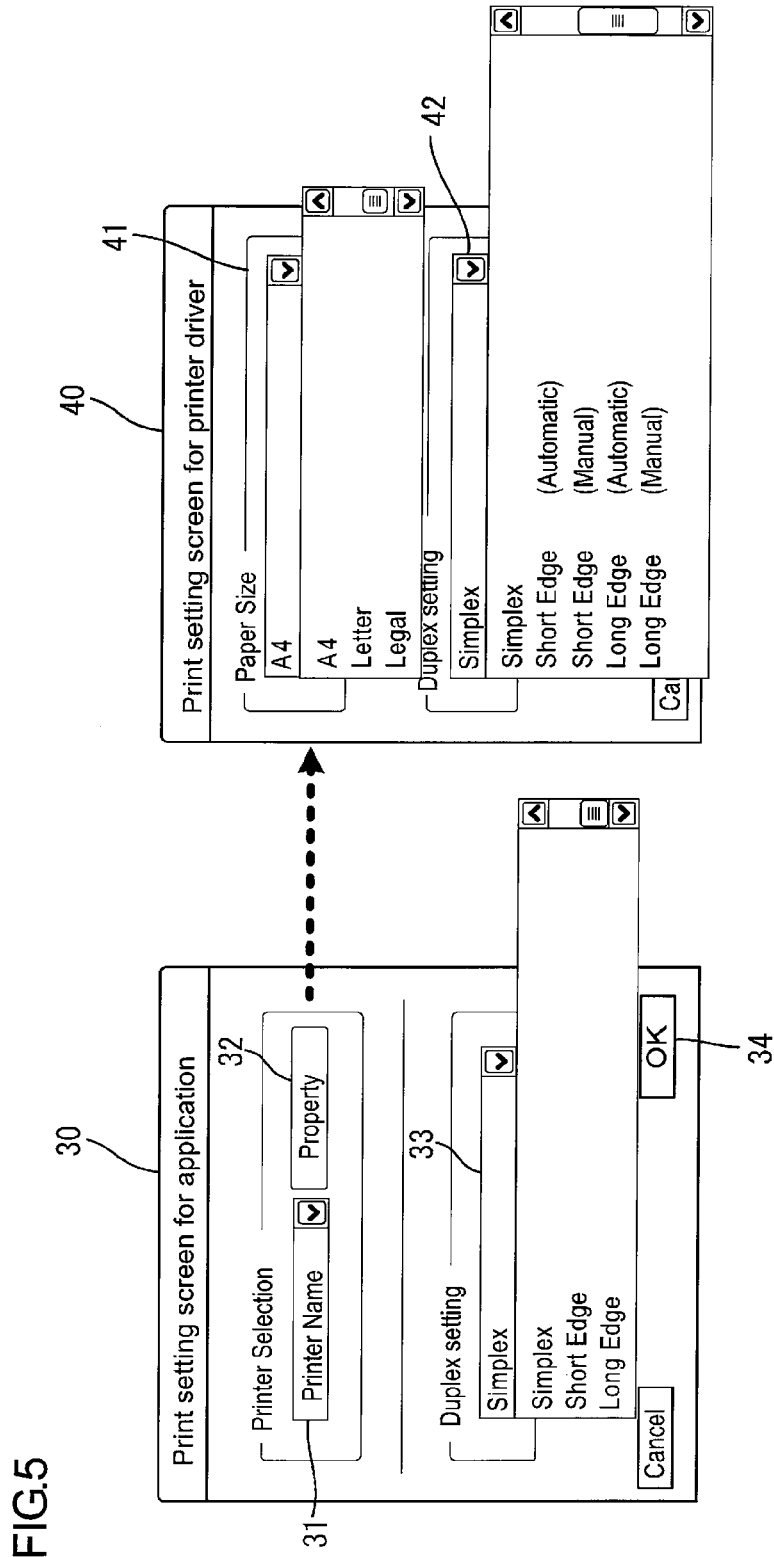
FIG. 5 is a diagram illustrating an example of a print setting screen that is displayed by an application and a print setting screen that is displayed by a print program.

An example of the print setting screen 30 that is displayed by the application will be explained with reference to FIG. 5. FIG. 5 also illustrates an example of a print setting screen 50 that is displayed by the printer driver. A drop-down list 31 for selecting a printer is displayed on the print setting screen 30 that is displayed by the application.

If the user selects a printer from the drop-down list 31 and clicks a "property" button 32, the application calls the printer driver of the selected printer and requests the selected printer driver to transmit the Print Capabilities. Then, the print setting screen 30 corresponding to the Print Capabilities is displayed. FIG. 4 does not illustrate the step of requesting the called printer driver to transmit the Print Capabilities to the application and the step of transmitting the Print Capabilities to the application from the called driver.

A drop-down list 33 for selecting a setting value of a part of the print setting items is displayed on the print setting screen 30. The drop-down list 33 illustrates options of setting values for selecting one of the options when the application generates a Print Ticket or when the application edits the Print Ticket that is generated by the printer driver. The application acquires setting values that are settable to the part of the print setting items from the Print Capabilities, and sets the acquired setting values in drop-down list 33 as the options.

Some applications set the setting values of only a Feature item as the options to be set in the drop-down list 33 and does not set the setting values of a Property item as the options. For example, as displayed on the print setting screen 30, as the options set in the drop-down list 33 of the print setting item "Duplex (one-sided printing or two-sided printing)", the setting values "Simplex (one-sided printing)", "Short Edge (two-sided printing and short edge bookbinding)" and "Long Edge (two-sided printing and long edge bookbinding)" are set in the list 33 and the setting values "Automatic" and "Manual" are not set in the list 33. The application of the illustrative aspect does not set the setting values of a Property item in the drop-down list 33 as the options.

As described above, the setting values of only a part of the print setting items (in the example in FIG. 5, "Simplex (one-sided printing)", "Short Edge (two-sided printing and short edge bookbinding)" and "Long Edge (two-sided printing and long edge bookbinding)") are settable on the print setting screen 30. Therefore, if a user wants to set setting values of another print setting item (for example, the setting values "Automatic" and "manual" of the Property item "two-sided printing mode"), the user clicks the "property" button 32 to call the selected printer driver from the drop-down list 31. The called printer driver generates a Print Ticket based on the setting values set from the print setting screen 40. Since the printer driver generates a Print Ticket in the illustrative aspect, a user clicks the "property" button 32.

At step 104, if the "property" button 32 is pressed, the application calls the printer driver of the selected printer via an interface that is provided by the OS.

At step 105, the printer driver called by the application displays the print setting screen 40 illustrated in FIG. 5 on the display device 17.

A drop-down list of the print setting items that is settable by the printer driver is displayed on the print setting screen 40 displayed by the printer driver. In the example in FIG. 5, the print setting items "One-side printing", "Short Edge (Automatic)", "Short Edge (Manual)", "Long Edge (Automatic)" and "Long Edge (Manual)" are displayed in a drop-down list 42 as the options. The setting values of a Property item ("Automatic" or "Manual") are displayed on the print setting screen displayed by the printer driver. In the illustrated example, a drop-down list 41 for "Paper size" and the drop-down list 42 for "One-sided printing or two-sided printing" are displayed on the print setting screen 40.

If a print setting item includes only a Feature item, setting values that are settable in the Feature item are set in the drop-down lists 41, 42 as the options. If a print setting item includes a Feature item and a Property item, combinations of setting values of the Feature item and the Property item are set in the drop-down lists 41, 42 as the options. The print setting screen 40 may be previously generated as a screen inherent to the printer driver or may be generated by the printer driver according to the print condition that is described in the Print Capabilities.

If a user selects one of the setting values from the drop-down list 41, 42 and clicks an "OK" button (not illustrated), setting of the print condition is completed. In the illustrative aspect, "Short Edge (Automatic)" (short edge bookbinding and automatic paper flipping) is set in the print setting item "Duplex (one-sided printing or two-sided printing)". If the setting of the print conditions is completed, the process proceeds to step 106.

At step 106, the printer driver executes a Print Ticket generation process that generates a Print Ticket based on the set printing condition ("Short Edge (Automatic)" in this example). The details of the Print Ticket generation process will be described later. The printer driver generates a Print Ticket that describes that "Short Edge (Automatic)" (short edge bookbinding and automatic paper flipping) is set in the print setting item "Duplex (one-sided printing or two-sided printing)", as illustrated in FIG. 3.

Specifically, in the Print Ticket generated by the printer driver, the setting value "Automatic" is set in the Property item "Duplex printing mode" of the first print condition and the second print condition. That is, the first print condition and the second print condition in the Print Ticket generated by the printer driver includes same print condition of the Property item.

At step 107, the printer driver transmits the generated Print Ticket (illustrated in FIG. 3) to the application via the OS and closes the print setting screen 40 after the transmission. After the print setting screen 40 is closed, the process returns to the control of the print setting screen 30 displayed by the application.

At step 108, the application displays the setting value of the print setting item "Duplex (one-sided printing or two-sided printing)" set in the Print Ticket that is transmitted from the printer driver in the drop-down list 33 as the currently selected setting value.

Specifically, the setting item "Short Edge (Automatic)" is set in the Print Ticket output from the printer driver. However, the setting value "Automatic" of the Property item "Two-sided printing mode" in the Print Ticket is described in the Tag structure that is not recognizable by the application. Therefore, the application is unable to recognize the setting value of the Property item.

Therefore, although the setting value "Short Edge (Automatic)" is set in the Print Ticket output from the printer driver, the setting value "Short Edge" is selected and set in the drop-down list 33 on the print setting screen 30 displayed by the application. At this time, the drop-down list 33 displays the setting values "Simplex" and "Long Edge" as the options that can be settable by the application. Here, the user can select one of the options from the drop-down list 33 and change the setting value. In the illustrative aspect, the user does not change the setting value from the drop-down list 33 here.

If the user changes the setting value "Short Edge" set in the drop-down list 33 and clicks the "OK" button 34, the application rewrites the setting value "Short Edge (Automatic)" set in the Print Ticket and sets the changed setting value ("Simplex" or "Long Edge") in the Print Ticket (editing). If the user does not change the setting value and clicks the "OK" button 34, the application rewires the setting value ("Short Edge (Automatic)") of the print setting item "Duplex (one-sided printing or two-sided printing)" set in the Print Ticket transmitted from the printer driver and sets the setting value that is currently selected from the drop-down list 33 ("Short Edge"). Thus, the application edits the Print Ticket. In the Print Ticket edited by the application illustrated in FIG. 6, the print condition surrounded by dotted lines in the first print condition in FIG. 3 is deleted. The options of the drop-down list 33 are set according to the Print Capabilities. Therefore, if the application rewrites the options and sets the setting value that is selected by the user, the Print Ticket is edited according to the Print Capabilities.

Figure 6:
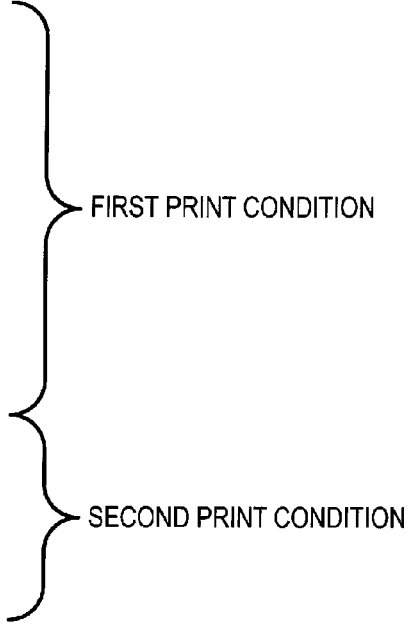
FIG. 6 is a diagram illustrating an example of an edited Print Ticket according to the illustrative aspect of the present invention.

On the print setting screen 30 that does not set the setting values of a Property item in the drop-down list 33 as the options, the setting value of a Property item set by the printer driver is not displayed and deleted from the Print Ticket at the time of editing by the application. Therefore, the setting value ("Automatic" or "Manual") of the Property item ("two-sided printing mode") is not set in the first print condition of the edited Print Ticket, as illustrated in FIG. 6. That is, in the edited Print Ticket, the print condition surrounded by the dotted lines in the first print condition in FIG. 3 is deleted.

Since the second print condition is not the one that is to be edited by the application, it is same as the one that is generated in the Print Ticket generation process.

At step 109, the application transmits the edited Print Ticket and a print command to the printer driver. The print command is information that is generated for every object such as character strings, figures or images that form a page that is to be printed. The information represents a content of the object or a coordinate that draws the object.

At step 110, the printer driver executes a print data producing process. In the print data producing process, the printer driver produces print data based on the Print Ticket transmitted from the application and the print command and transmits the print data to the printer. The details of the print data producing process will be described later.

(2-4) Print Ticket Generation Process

Figure 7:
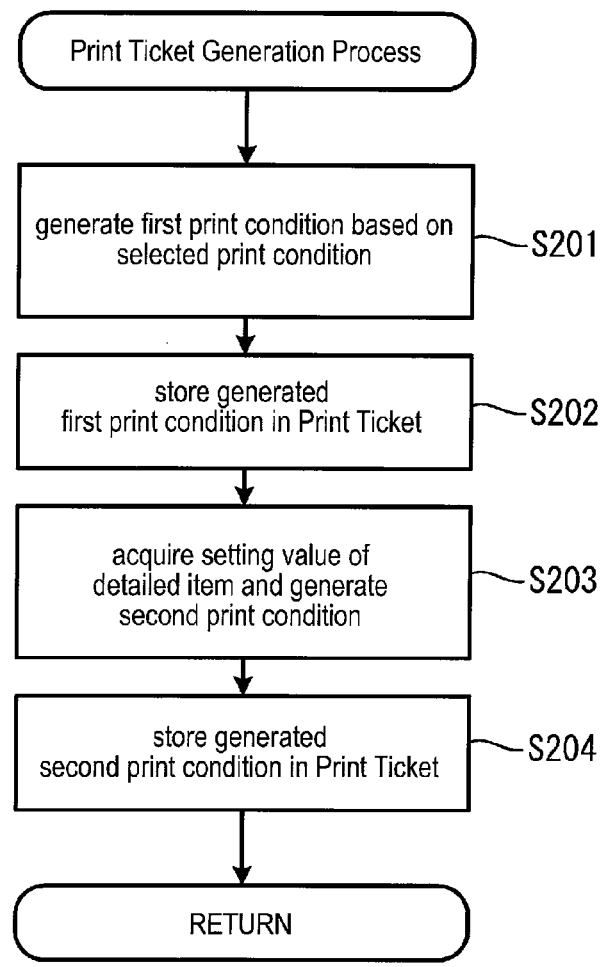
FIG. 7 is a flowchart illustrating a flow of a Print Ticket generation process.

A flow of the Print Ticket generation process will be explained with reference to FIG. 7.

At step 201, the printer driver generates the first print condition including the setting value of a Property item as illustrated in FIG. 3 based on the print condition that is selected by the user from the print setting screen 40. The printer driver acquires the setting value that is selected by the user out of the setting values described in the Print Capabilities and generates the first print condition.

At step 202, the printer driver stores the generated first print condition in the Print Ticket. The first print condition is stored in the Print Ticket so as to correspond to the format described in the Print capabilities.

At step 203, the printer driver acquires the setting value of the Property item from the print condition that is selected by the user and generates the second print condition as illustrated in FIG. 3.

At step 204, the printer driver stores the generated second print condition related to the setting value of a Property item in the Print Ticket. The second print condition is stored in the Print Ticket in a format that is different from the one described in the Print Capabilities.

(2-5) Print Data Producing Process

Figure 8:
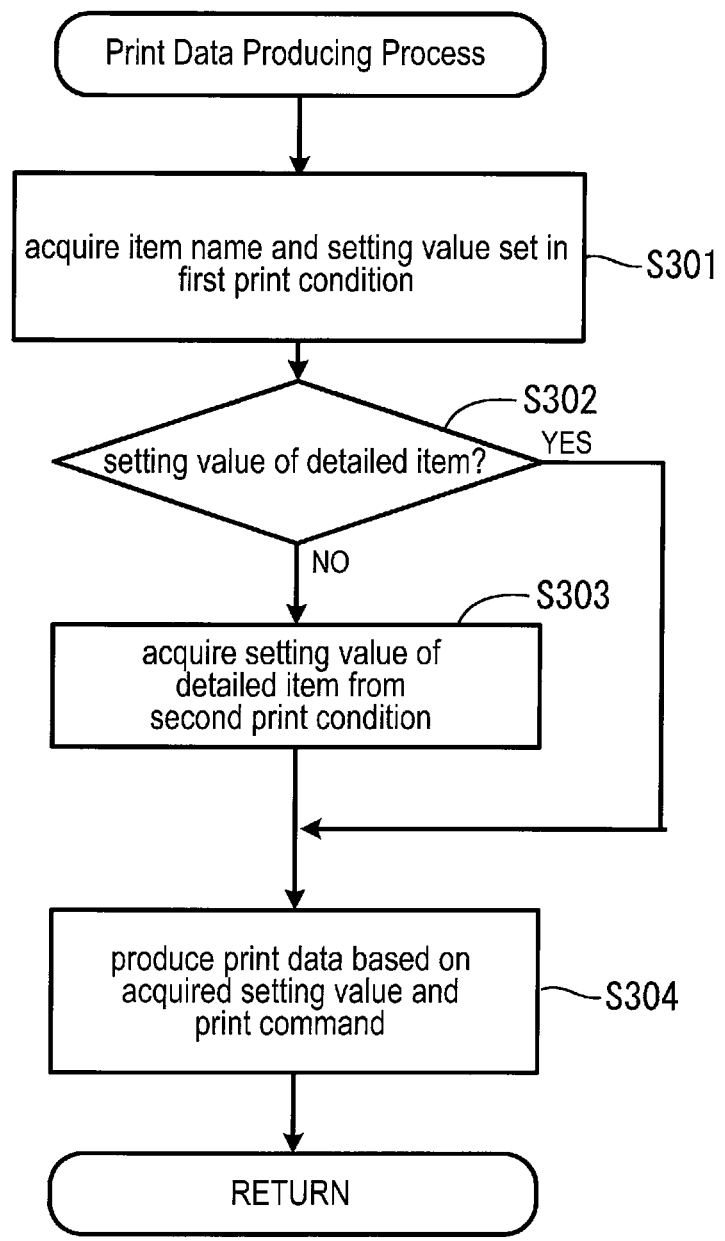
FIG. 8 is a flowchart illustrating a flow of a print data producing process.

A flow of the print data producing process will be explained with reference to FIG. 8.

At step 301, the printer driver executes syntactic analysis for the Print Ticket and acquires the item names and the setting values of the print setting items that are set in the first print condition.

At step 302, the printer driver determines whether the setting value of a Property item is set in the first print conditions.

Specifically, the printer driver determines whether each item name of the acquired print condition is an item name of a print setting item including a Feature item and a Property item (for example, "One-sided printing or two-sided printing"). If determining that the item name is an item name of a print setting item including a Feature item and a Property item, the printer driver determines whether the setting value set in the Feature item is one including a Property item in which a setting value is to be set ("Short Edge" or "Long Edge"). If determining that the setting value set in the Feature item is one including a Property item in which a setting value is to be set ("Short Edge" or "Long Edge"), the printer driver determines whether a setting value ("Automatic" or "Manual") is set in the Property item ("two-sided printing mode").

If determining that each item name of the first print condition is an item name of a print setting item including a Feature item and a Property item and a setting value is not set in the Property item, the printer driver determines that a setting value is not set in the Property item and the process proceeds to step 303. Otherwise, the process proceeds to step 304.

In the example of the Print Ticket in FIG. 6, the setting value of the Property item of the first print condition is deleted at the time of editing by the application. Therefore, it is determined that the setting value of the Property item is not set at step 302.

At step 303, the printer driver acquires from the second print condition the setting value of the Property item ("Two-sided printing mode") in which a setting value is not set in the first print condition. In the example of the Print Ticket illustrated in FIG. 6, the setting value "Automatic" is set in the second print condition as a setting value of the "Two-sided printing mode". Therefore, the setting value "Automatic" is acquired as the setting value of the "Two-sided printing mode".

At step 304, the printer driver produces print data based on the print conditions (setting values of each print setting item) acquired from the Print Ticket and the print command output from the application.

Specifically, the application outputs the print command generated based on the print object page to the OS. The OS generates a draw command based on the output print command and outputs the draw command to the printer driver. The printer driver produces a control command (print data) for the printer 2 based on the draw command output from the OS and the print conditions acquired from the Print Ticket and transmits the print data to the printer 2.

(3) Effects of the Illustrative Aspect

The printer driver of the illustrative aspect generates Print Ticket based on print setting information including a second print condition that is unable to be edited by the application and describes at least a part of a first printing condition. In the Print Ticket generated by the printer driver, the setting value of a Property item is set in the first print condition and the second print condition. Therefore, even if the setting value of a Property item of the first print condition is deleted when the application receives the Print Ticket from the printer driver and edits the first print condition, the setting value of the Property item is set in the second print condition. Therefore, even if the print conditions are not appropriately set, print data is produced based on appropriate print conditions.

If the setting value is not set in the Print Ticket, a default value may be used. However, the default value does not necessarily correspond to the setting value selected by a user (the setting value selected by a user from the print setting screen 40 displayed by the printer driver). The second print condition includes the setting value that is selected by a user. Therefore, since the setting value is acquired from the second print condition in this illustrative aspect, a printing result corresponds to the print conditions selected by the user more precisely compared to a case using the default value.

Further, the printer driver of the illustrative aspect sets only the setting value of a Property item in the second print conditions if the print setting item includes a Feature item and a Property item. Accordingly, the data amount of the Print Ticket is reduced compared to the case that the setting value of a Feature item is also set in the second print conditions.

<Another Illustrative Aspect>

Figure 9:
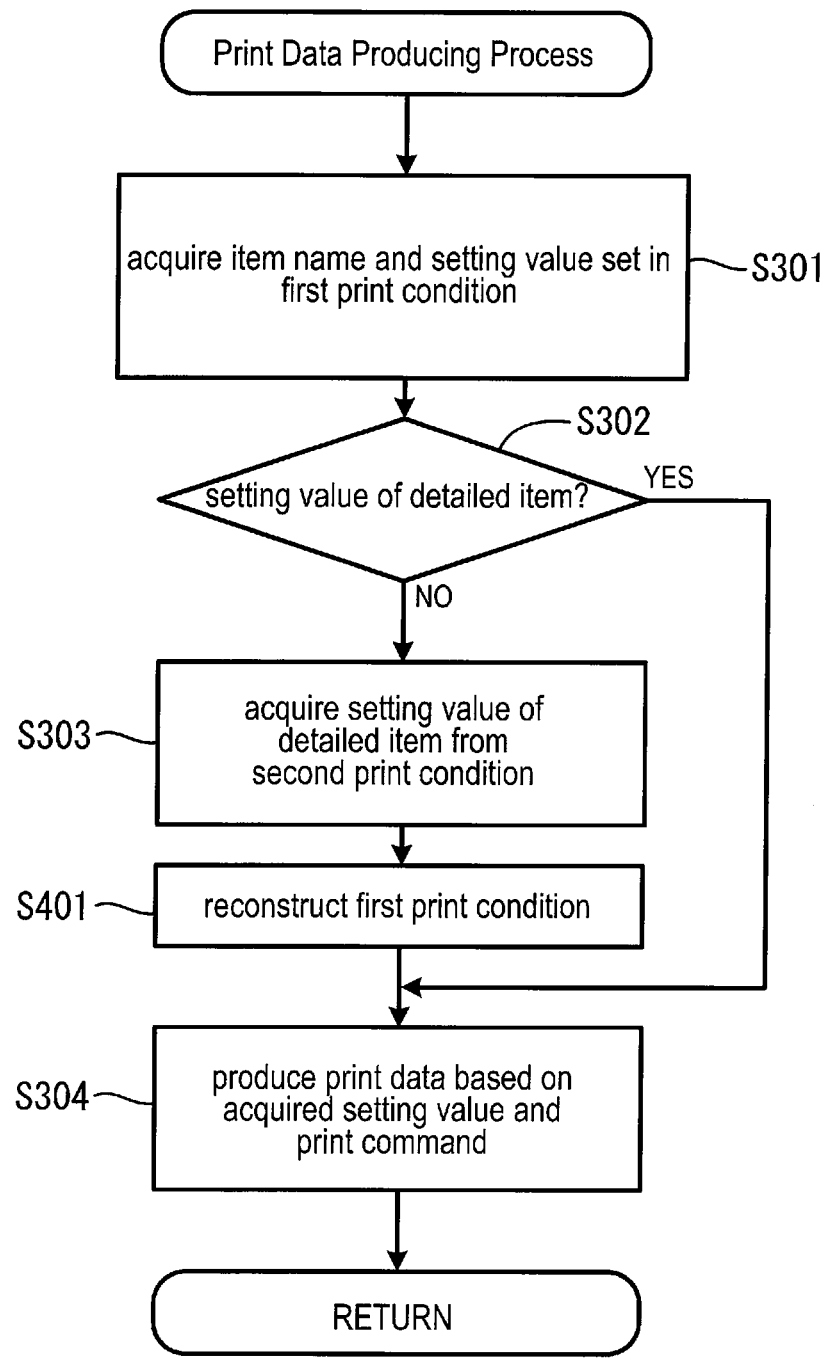
FIG. 9 is a flowchart illustrating a flow of a reconstruction process of a Print Ticket according to a second illustrative aspect of the present invention.

Next, another illustrative aspect of the present invention will be explained with reference to FIG. 9.

In the another illustrative aspect, instead of the print data producing process of the illustrative aspect, the printer driver acquires the setting value of a Property item from the second print condition and reconstructs the first print condition and executes the print data producing process that produces print data based on the Print Ticket having the reconstructed first print condition.

A flow of the print data producing process of the another illustrative aspect will be explained with reference to FIG. 9. The substantially same processes as the ones executed in the print data producing process of the illustrative aspect are indicated by the same symbols and the explanation thereof is omitted.

At step 401, the printer driver (an example of a reconstruction section) adds the setting value of a Property item acquired from the second print conditions to the first print condition included in the Print Ticket that is edited by the application. Accordingly, the printer driver reconstructs the first print condition. Since the second print condition is unnecessary for the Print Ticket in which the first print condition is reconstructed, the printer driver deletes the second print condition from the Print Ticket.

A content of the Print Ticket in which the first print condition is reconstructed and from which the second print condition is deleted to include the second print condition is same as that of the conventional Print Ticket before editing illustrated in FIG. 10. The Print Ticket in which the first print condition is reconstructed may not delete the second print condition but include it.

The program module that produces print data based on the Print Ticket including the first print condition has been conventionally used. According to the printer driver of the another illustrative aspect, since the first print condition in the Print Ticket is reconstructed, the conventionally used program module is used for producing print data based on the Print Ticket in which the first print conditions are reconstructed.

<Other Illustrative Aspects>

The present invention is not limited to the aspects explained in the above description with reference to the drawings. The following aspects may be included in the technical scope of the present invention, for example.

(1) In the above illustrative aspects, only the setting value of a Property item is described in the second print condition. However, the setting value of a Feature item may be described in the second print condition in addition to the setting value of a Property item.

(2) In the above illustrative aspects, one print setting item includes a Feature item and a Property item. However, the print setting item may include further defined items. For example, one print setting item may include a Feature item, a Middle item, and a Property item. In such a case, only the setting value of a Property item may be described in the second print condition, or the setting values of a Middle item and a Property item may be described therein.

(3) In the above illustrative aspects, the application displays the print setting screen 30 so as to correspond to the Print Capabilities acquired from the printer driver. However, the application may display the print setting screen 30 that is previously provided with the application.

In such a case, the application searches one of the setting values of the Print Capabilities that corresponds to the one set from the print setting screen 30 that is provided by the application, and describes the searched setting value in the Print Ticket.

If the print setting item of the print setting screen 30 that is previously provided with the application includes only a Feature item of the Print Capabilities and the first print condition is edited at step 108, only the setting value of the Feature item is described in the first print condition.

Therefore, the same effects as the above illustrative aspects are obtained by applying the present invention to the case that the setting value is set from the print setting screen that is previously provided with the application.

(4) In the above illustrative aspects, the CPU 11 executes various controls. However, a plurality of CPUs may be provided to execute each of the controls.

What is claimed is:

1. A data processing apparatus comprising:
    a processor; and
    memory storing executable instructions that, when executed by the processor, cause the data processing apparatus to:
        receive a user print instruction;
        set a first setting value to a first setting item;
        set a second setting value to a second setting item that is related to and is a detailed item of the first setting item;
        generate a first print condition including the first setting item having the first setting value and the second setting item having a second setting value;
        generate a second print condition separate from the first print condition, the second print condition including the second setting item having the second setting value, each of the second setting item and the second setting value included in the second print condition having a same content as a content of the second setting item and a content of the second setting value, respectively, included in the first print condition;
        generate print setting information specific to a print instruction, the generated print setting information including the first print condition and the second print condition, each of the first print condition and the second print condition including the second setting item having the same respective content and the second setting value having the same respective content;
        determine whether the second setting item included in the generated first print condition of the generated print setting information has the second setting value;
        in response to determining that the second setting item included in the generated first print condition of the generated print setting information does not have the second setting value, previously set for the first setting item when the first print condition was generated, as a result of a change to the second setting item included in the first print condition:
            obtain the second setting value of the second setting item in the second print condition included in the print setting information, and
            produce print data corresponding to the print instruction and based on the first print condition having no second setting value and included in the print setting information and the second setting value of the second setting item obtained from the generated second print condition.

2. The data processing apparatus according to claim 1, wherein the second setting item is subject to at least the first setting item, and the second setting item is required to be set when the at least the first setting item is included in the first print condition.

3. The data processing apparatus according to claim 1, further comprising a display,
    wherein the instructions, when executed by the processor, further cause the data processing apparatus to select one of a plurality of first setting items and the second setting item in generating the first print condition or the second print condition, and
    wherein the display is configured to display a name of the selected one of the first setting items and the second setting item, and the first setting value or the second setting value.

4. The data processing apparatus according to claim 1, wherein the first setting item includes a one-sided printing/two-sided printing option and the second setting item includes a two-sided printing attribute.

5. The data processing apparatus according to claim 1, wherein the instructions correspond to a printer driver, and wherein the data processing apparatus is further caused to:
    provide the generated print setting information to an application program different from the printer driver; and
    receive the generated print setting information back from the application program with a modification to the second setting item in the generated first print condition, the modification being made in response to an instruction from an application program different from the printer driver.

6. The data processing apparatus according to claim 1, wherein the instructions, when executed by the processor, further cause the data processing apparatus to:
    determine whether the first setting item included in the generated print setting information requires setting of the second setting value to the second setting item; and
    in response to determining that the first setting item included in the print setting information requires the setting of the second setting value to the second setting item, determine whether the second setting item included in the generated first print condition of the generated print setting information has the second setting value.

7. The data processing apparatus according to claim 6, wherein the instructions, when executed by the processor, further cause the data processing apparatus to:
    in response to a change to the first setting value that is related to the second setting item having the second setting value, cancel the second setting value that is set to the second setting item from the first print condition.

8. The data processing apparatus according to claim 1, wherein the second setting value of the second setting item in the generated second print condition is unaffected by the change to the second setting item in the generated first print condition.

9. The data processing apparatus according to claim 1, wherein determining that the second setting item included in the generated first print condition of the generated print setting information does not have the second setting value includes:
    determining that the second setting item included in the generated first print condition does not have any setting value as a result of the change to the second setting item in the generated first print condition.

10. A non-transitory computer readable medium storing instructions that, when executed by a processor, cause a data processing apparatus to:
    receive a user print instruction;
    set a first setting value to a first setting item;
    set a second setting value to a second setting item that is related to and is a detailed item of the first setting item;
    generate a first print condition including the first setting item having the first setting value and the second setting item having a second setting value;

generate a second print condition separate from the first print condition, the second print condition including the second setting item having the second setting value, each of the second setting item and the second setting value included in the second print condition having a same content as a content of the second setting item and a content of the second setting value, respectively, included in the first print condition;

generate print setting information specific to a print instruction, the generated print setting information including the first print condition and the second print condition, each of the first print condition and the second print condition including the second setting item having the same respective content and the second setting value having the same respective content;

determine whether the second setting item included in the generated first print condition of the generated print setting information has the second setting value;

in response to determining that the second setting item included in the generated first print condition of the generated print setting information does not have the second setting value, previously set for the first setting item when the first print condition was generated, as a result of a change to the second setting item in the generated first print condition:

obtain the second setting value of the second setting item in the second print condition included in the print setting information, and produce print data corresponding to the print instruction and based on the first print condition having no second setting value and included in the print setting information and the second setting value of the second setting item obtained from the generated second print condition.

11. The non-transitory computer readable medium according to claim 10, wherein the second setting item is subject to at least the first setting item, and the second setting item is required to be set when the at least the first setting item is included in the first print condition.

12. The non-transitory computer readable medium according to claim 10, wherein the instructions correspond to a printer driver, and the data processing apparatus is further caused to:

provide the generated print setting information to an application program different from the printer driver; and receive the generated print setting information back from the application program with a modification to the second setting item in the generated first print condition, the modification being made in response to an instruction from an application program different from the printer driver.

13. The computer readable medium according to claim 10, wherein the instructions, when executed by the processor, further cause the data processing apparatus to:

determine whether the first setting item included in the generated print setting information requires setting of the second setting value to the second setting item; and in response to determining that the first setting item included in the print setting information requires the setting of the second setting value to the second setting item, determine whether the second setting item included in the generated first print condition of the generated print setting information has the second setting value.

14. The computer readable medium according to claim 13, wherein the instructions, when executed by the processor, further cause the data processing apparatus to:

in response to a change to the first setting value that is related to the second setting item having the second setting value, cancel the second setting value that is set to the second setting item from the first print condition.

15. The computer readable medium according to claim 10, wherein the second setting value of the second setting item in the generated second print condition is unaffected by the change to the second setting item in the generated first print condition.

16. The non-transitory computer readable medium of claim 10, wherein determining that the second setting item included in the generated first print condition of the generated print setting information does not have the second setting value includes:

determining that the second setting item included in the generated first print condition does not have any setting value as a result of the change to the second setting item in the generated first print condition.

17. A method comprising:

receiving a user print instruction;

setting, by a data processing apparatus, a first setting value to a first setting item;

setting a second setting value to a second setting item that is related to and is a detailed item the first setting item;

generating a first print condition including the first setting item having the first setting value and the second setting item having the second setting value;

generating a second print condition separate from the first print condition, the second print condition including the second setting item having the second setting value, each of the second setting item and the second setting value included in the second print condition having a same content as a content of the second setting item and a content of the second setting value, respectively, included in the first print condition;

generating print setting information specific to the user print instruction, the generated print setting information including the first print condition and the second print condition, each of the first print condition and the second print condition including the second setting item having the same respective content and the second setting value having the same respective content;

determining whether the second setting item included in the generated first print condition of the generated print setting information has the second setting value; and in response to determining that the second setting item included in the generated first print condition of the generated print setting information does not have the second setting value, previously set for the first setting item when the first print condition was generated, as a result of a change to the second setting item in the generated first print condition:

obtaining the second setting value of the second setting item in the second print condition included in the print setting information, and producing print data corresponding to the user print instruction and based on the generated first print condition included in the generated print setting information and the second setting value of the second setting item obtained from the generated second print condition.

18. The method according to claim 17, wherein the second setting item is subject to at least the first setting item, and the second setting item is required to be set when the at least the first setting item is included in the first print condition.

19. The method according to claim 17, wherein the method is performed by the data processing apparatus in response to execution of a printer driver, and wherein method further comprises:

provided the generated print setting information to an application program different from the printer driver; and receiving the generated print setting information back from the application program with a modification to the second setting item in the generated first print condition, the modification being made in response to an instruction from an application program different from the printer driver.

20. The method according to claim 17, further comprising:

determining whether the first setting item included in the generated print setting information requires setting of the second setting value to the second setting item; and in response to determining that the first setting item included in the print setting information requires the setting of the second setting value to the second setting item, determining whether the second setting item included in the generated first print condition of the generated print setting information has the second setting value.

21. The method according to claim 20, further comprising:

in response to a change to the first setting value that is related to the second setting item having the second setting value, cancelling the second setting value that is set to the second setting item from the first print condition.

22. The method according to claim 17, wherein the second setting value of the second setting item in the generated second print condition is unaffected by the change to the second setting item in the generated first print condition.

23. The method of claim 17, wherein determining that the second setting item included in the generated first print condition of the generated print setting information does not have the second setting value includes:

determining that the second setting item included in the generated first print condition does not have any setting value as a result of the change to the second setting item in the generated first print condition.

* * * * *